United States Patent
Nie

(10) Patent No.: US 10,261,531 B1
(45) Date of Patent: Apr. 16, 2019

(54) CONTROL CIRCUITRY OF SMART WALL SWITCH

(71) Applicant: NIE-TECH CO.,LTD., Dongguan (CN)

(72) Inventor: Jianghai Nie, Dongguan (CN)

(73) Assignee: NIE-TECH CO., LTD., Dongguan (CN)

( * ) Notice: Subject to any disclaimer, the term of this patent is extended or adjusted under 35 U.S.C. 154(b) by 0 days.

(21) Appl. No.: 16/115,848

(22) Filed: Aug. 29, 2018

(30) Foreign Application Priority Data

Jun. 28, 2018 (CN) .................... 2018 2 1006606 U

(51) Int. Cl.
*G05B 19/418* (2006.01)
*G08C 17/00* (2006.01)
*G05F 1/46* (2006.01)

(52) U.S. Cl.
CPC ........... *G05F 1/465* (2013.01); *G05B 19/418* (2013.01); *G08C 17/00* (2013.01)

(58) Field of Classification Search
CPC ........ G05F 1/465; G05B 19/418; G08C 17/00
See application file for complete search history.

(56) References Cited

U.S. PATENT DOCUMENTS

| 7,687,940 | B2* | 3/2010 | Mosebrook | H05B 37/0209 307/115 |
| 9,054,465 | B2* | 6/2015 | Hodges | H01R 13/7038 |
| 9,538,619 | B2* | 1/2017 | Swatsky | H05B 37/0272 |
| 10,123,393 | B1* | 11/2018 | Soto | G08C 17/02 |
| 10,194,510 | B2* | 1/2019 | Dadashnialehi | H05B 37/0272 |

* cited by examiner

*Primary Examiner* — Kenneth B Wells
(74) *Attorney, Agent, or Firm* — Hemisphere Law, PLLC; Zhigang Ma

(57) ABSTRACT

The present disclosure discloses a control circuitry of a smart wall switch. The control circuitry includes a primary step-down sub-circuitry, a secondary step-down sub-circuitry, an output control sub-circuitry, a microcontroller, an OTA (Over-the-Air) sub-circuitry, a three-way switch, a three-way switch conversion sub-circuitry, and a wireless communication sub-circuitry. An input terminal of the primary step-down sub-circuitry is connected to a power supply, an output terminal of the primary step-down sub-circuitry is connected to an input terminal of the secondary step-down sub-circuitry, and an output terminal of the secondary step-down sub-circuitry is connected to the microcontroller, an input terminal of the output control sub-circuitry is connected to the microcontroller, a first output terminal of the output control sub-circuitry is connected between the power supply and the primary step-down sub-circuitry, and a second output terminal of the output control sub-circuitry is connected to a load.

6 Claims, 9 Drawing Sheets

CONTROL CIRCUITRY OF SMART WALL SWITCH

CROSS-REFERENCE TO RELATED APPLICATIONS

This Application claims priority from Chinese Patent Application No. 201821006606.6 filed on Jun. 28, 2018, the disclosures of which is incorporated by reference herein in its entirety.

BACKGROUND

1. Field

The present disclosure relates to a control circuitry of a smart wall switch.

2. Description of the Related Art

At present, a smart wall switch with functions of three-way switching on the market needs an external customized mechanical switch coupled to a three-way circuit thereof, to realize the function of three-way switching. However, it is complicated to complete the control circuit and inconvenient to operate.

SUMMARY

It is an aspect to provide a control circuitry of a smart wall switch. The control circuitry includes a primary step-down sub-circuitry, a secondary step-down sub-circuitry, an output control sub-circuitry, a microcontroller, an OTA (Over-the-Air) sub-circuitry, a three-way switch, a three-way switch conversion sub-circuitry, a wireless communication sub-circuitry, a key input control sub-circuitry and a context function control sub-circuitry, the input terminal of the primary step-down sub-circuitry is connected to a power supply, and is configured to regulate the voltage of the power supply to 5V, the output terminal of the primary step-down sub-circuitry is connected to the input terminal of the secondary step-down sub-circuitry, and the output terminal of the secondary step-down sub-circuitry is connected to the microcontroller, the secondary step-down sub-circuitry is configured to regulate the voltage from 5V to 3.3V, the input terminal of the output control sub-circuitry is connected to the microcontroller, a first output terminal of the output control sub-circuitry is connected between the power supply and the primary step-down sub-circuitry, and a second output terminal of the output control sub-circuitry is connected to a load, the output control sub-circuitry outputs a voltage of 120V-240V, the three-way switch is connected to the microcontroller through the three-way switch conversion sub-circuitry, the key input control sub-circuitry is connected to the microcontroller and the wireless communication sub-circuitry, the wireless communication sub-circuitry is communicated with the microcontroller with data transmission, the output control sub-circuitry, the OTA sub-circuitry, and the context function control sub-circuitry are all connected to the wireless communication sub-circuitry.

Optionally, a detection sub-circuitry connected to the microcontroller is further provided.

The advantages of the present disclosure include:
1) The function of the external mechanical switch is realized by the three-way switch conversion sub-circuitry in the device, such that the user does not need to purchase an external customized mechanical switch to implement the three-way function.
2) Being more convenient to be assembled.
3) The context function control sub-circuitry is more convenient for the user to do intelligent control, without wiring, and realizing wireless control between smart wall switches.

DETAILED DESCRIPTION

The following further describes the technical solutions of the present disclosure with reference to the accompanying drawings and specific embodiments. It should be understood that, the exemplary embodiments described below are merely for illustration and explanation of the present disclosure, but not for limiting the present disclosure.

Figure 1:
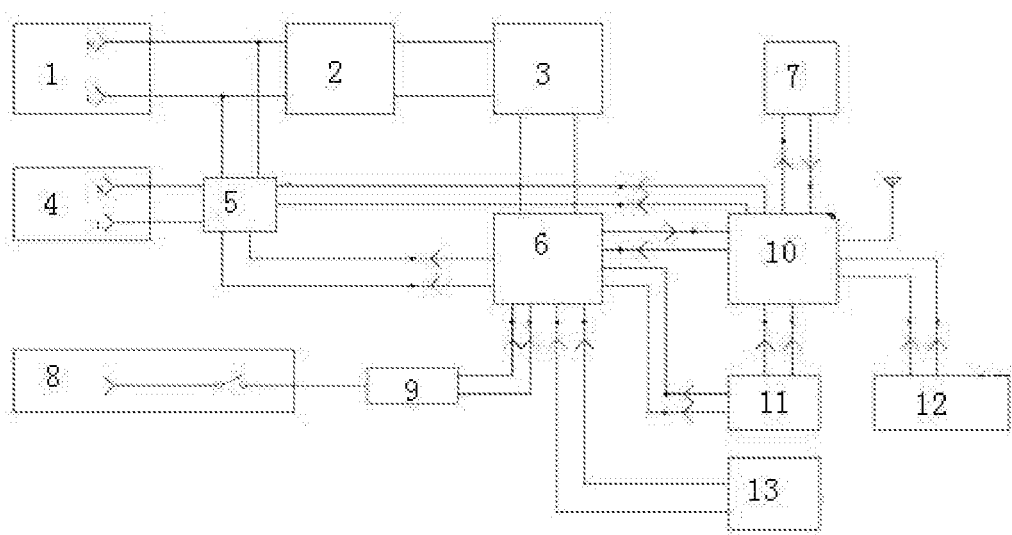
FIG. 1 is a block diagram of a main control circuitry structure of a smart wall switch with three-way switch.
Figure 2:
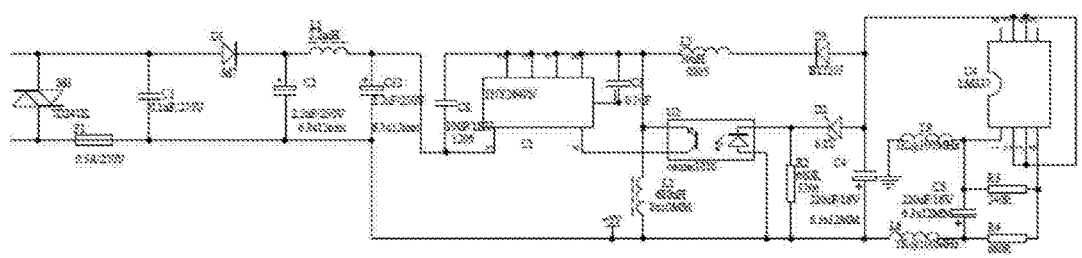
FIG. 2 is a schematic diagram of a circuit structure of a primary step-down sub-circuitry of the control circuitry of FIG. 1.
Figure 3:
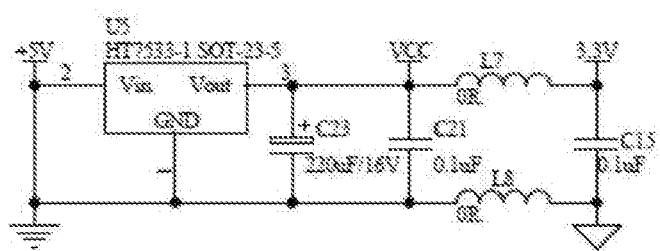
FIG. 3 is a schematic diagram of a circuit structure of a secondary step-down sub-circuitry of the control circuitry of FIG. 1.
Figure 4:
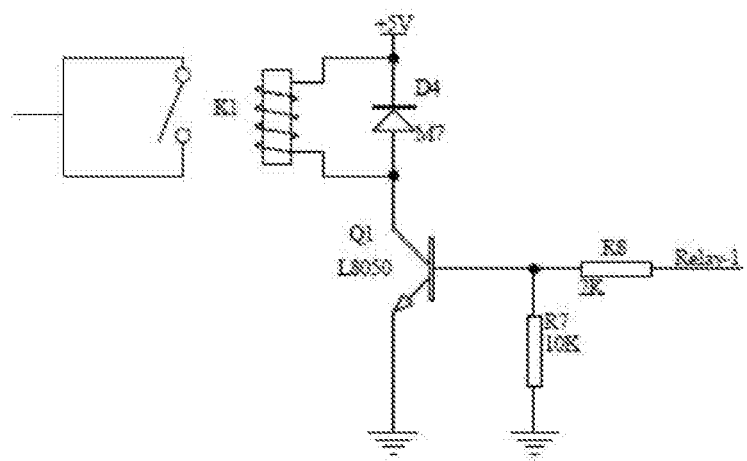
FIG. 4 is a schematic diagram of a circuit structure of an output control sub-circuitry of the control circuitry of FIG. 1, according to a first embodiment of the present disclosure.
Figure 5:
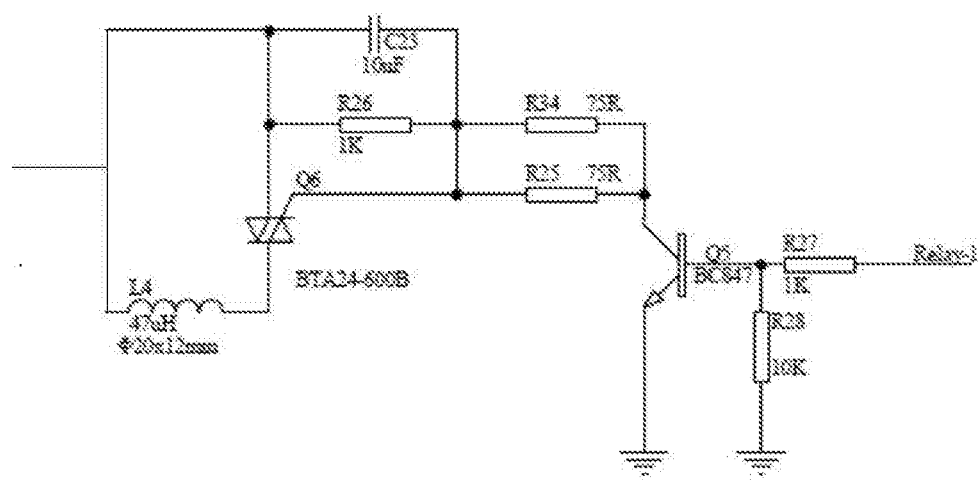
FIG. 5 is a schematic diagram of a circuit structure of an output control sub-circuitry of the control circuitry of FIG. 1, according to a second embodiment of the present disclosure.
Figure 6:
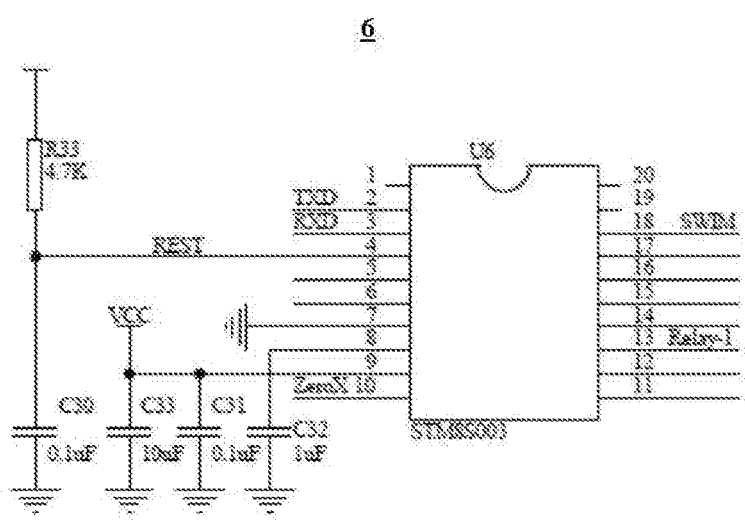
FIG. 6 is a structure diagram of a microcontroller of the control circuitry of FIG. 1.
Figure 7:
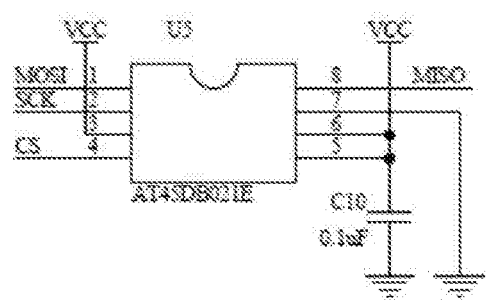
FIG. 7 is a structural diagram of an OTA sub-circuitry of the control circuitry of FIG. 1.
Figure 8:
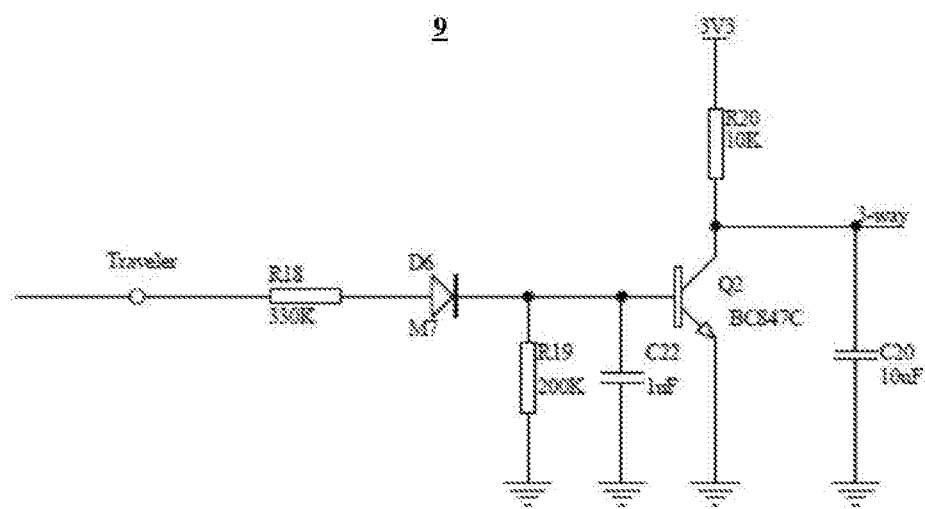
FIG. 8 is a circuit structure diagram of a three-way switch conversion sub-circuitry of the control circuitry of FIG. 1.
Figure 9:
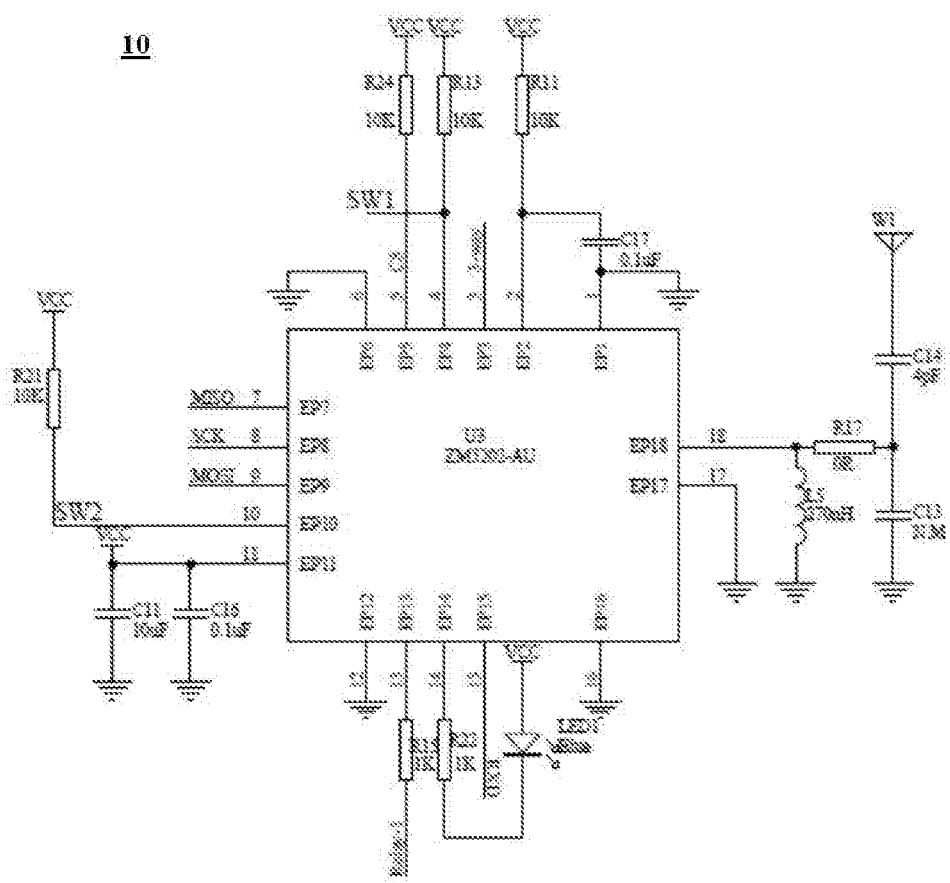
FIG. 9 is a structural diagram of a wireless communication sub-circuitry of the control circuitry of FIG. 1.

Referring to FIGS. 1 to 9, a control circuitry of a novel smart wall switch includes a primary step-down sub-circuitry 2, a secondary step-down sub-circuitry 3, an output control sub-circuitry 5, a microcontroller 6, an OTA sub-circuitry 7, a three-way switch 8, a three-way switch conversion sub-circuitry 9, a wireless communication sub-circuitry 10, a key input control sub-circuitry 11 and a context function control sub-circuitry 12.

The input terminal of the primary step-down sub-circuitry 2 (chip type TNY264) is connected to a power supply 1 (with input voltage on AC120-240V)), and is configured to regulate the voltage of the power supply to 5V. The output terminal of the primary step-down sub-circuitry 2 is connected to the input terminal of the secondary step-down sub-circuitry 3 (chip type HT7533), and the output terminal of the secondary step-down sub-circuitry 3 is connected to the microcontroller 6. The secondary step-down sub-circuitry 3 is configured to regulate the voltage from 5V to 3.3V. The input terminal of the output control sub-circuitry 5 is connected to the microcontroller 6. A first output terminal of the output control sub-circuitry 5 is connected between the power supply 1 and the primary step-down sub-circuitry 2, and a second output terminal of the output control sub-circuitry 5 is connected to a load 4. The output control sub-circuitry 5 outputs a voltage of 120V-240V. The three-way switch 8 is connected to the microcontroller 6 through the three-way switch conversion sub-circuitry 9, the key input control sub-circuitry 11 is connected to the microcontroller 6 and the wireless communication sub-circuitry 10. The wireless communication sub-circuitry 10 is communicated with the microcontroller 6 with data transmission. The output control sub-circuitry 5, the OTA sub-circuitry 7, and the context function control sub-circuitry 12 are all connected to the wireless communication sub-circuitry 10.

Furthermore, a detection sub-circuitry 13 is coupled to the microcontroller 6, configured to detect the signal from the key input control sub-circuitry 11, in real time.

The working principle of the present control circuitry is: the microcontroller 6 detects the signal from the key input control sub-circuitry 11 in real time, when microcontroller 6 receives a signal of the key input control sub-circuitry, the microcontroller controls the output control sub-circuitry 5 to output a control signal, and simultaneously transmits a wireless signal from the wireless communication sub-circuitry 10.

The microcontroller 6 monitors the three-way switch conversion sub-circuitry in real time. When receiving a signal from the three-way switch conversion sub-circuitry, the microcontroller controls the output control sub-circuitry 5 to output another control signal, and simultaneously transmits another wireless signal from the wireless communication sub-circuitry 10.

When the microcontroller 6 receives the wireless signal from the wireless communication sub-circuitry 10, the output control sub-circuitry 5 is controlled to output signals, and the microcontroller 6 returns the current state of the wireless communication sub-circuitry 10.

When the wireless communication sub-circuitry 10 receives a request from the context function sub-circuitry 12, the request is forwarded to the microcontroller 6 to process, and the microcontroller transmits the processed signal to the other wall switch through the wireless communication sub-circuitry 10, wirelessly. The context function sub-circuitry enables unlimited remote control between switch devices.

For example, assume that there are three devices named as device A, device B and device C. The device B and the device C are wirelessly controlled by the context function sub-circuitry 12 disposed in device A. The device A and the device C are wirelessly controlled by the context function sub-circuitry 12 disposed in device B. The device A and the device B are wirelessly controlled by the context function sub-circuitry 12 disposed in device C. In this embodiment, the context function sub-circuitry 12 is embedded in the wireless communication sub-circuitry 10.

The functions of product can be updated through the OTA sub-circuitry 7, to achieve online upgrade.

The microcontroller monitors the data of the detection sub-circuitry 13 in real time and sends the detected data through the wireless communication sub-circuitry 10. In other embodiments, the user can also set the microcontroller to control the output of the output control sub-circuitry 5 by using the data of the detection sub-circuitry 13.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control circuitry of a smart wall switch, comprising a primary step-down sub-circuitry, a secondary step-down sub-circuitry, an output control sub-circuitry, a microcontroller, an OTA (Over-the-Air) sub-circuitry, a three-way switch, a three-way switch conversion sub-circuitry, and a wireless communication sub-circuitry, wherein, an input terminal of the primary step-down sub-circuitry is connected to a power supply, and the primary step-down sub-circuitry is configured to regulate the voltage of the power supply, an output terminal of the primary step-down sub-circuitry is connected to an input terminal of the secondary step-down sub-circuitry, and an output terminal of the secondary step-down sub-circuitry is connected to the microcontroller, an input terminal of the output control sub-circuitry is connected to the microcontroller, a first output terminal of the output control sub-circuitry is connected between the power supply and the primary step-down sub-circuitry, and a second output terminal of the output control sub-circuitry is connected to a load, the three-way switch is connected to the microcontroller through the three-way switch conversion sub-circuitry, and the wireless communication sub-circuitry is communicated with the microcontroller with data transmission.

2. The control circuitry of claim 1, further comprising a detection sub-circuitry connected to the microcontroller.

3. The control circuitry of claim 1, further comprising a key input control sub-circuitry and a context function control sub-circuitry, the key input control sub-circuitry is connected to the microcontroller and the wireless communication sub-circuitry to provide input signals thereto, and the context function control sub-circuitry is connected to the wireless communication sub-circuitry.

4. The control circuitry of claim 3, wherein the output control sub-circuitry, the OTA sub-circuitry, and the context function control sub-circuitry are all connected to the wireless communication sub-circuitry.

5. The control circuitry of claim 1, wherein the secondary step-down sub-circuitry is configured to regulate the voltage from 5V to 3.3V.

6. The control circuitry of claim 1, wherein the output control sub-circuitry outputs a voltage of 120V-240V.

* * * * *